Figure 1:
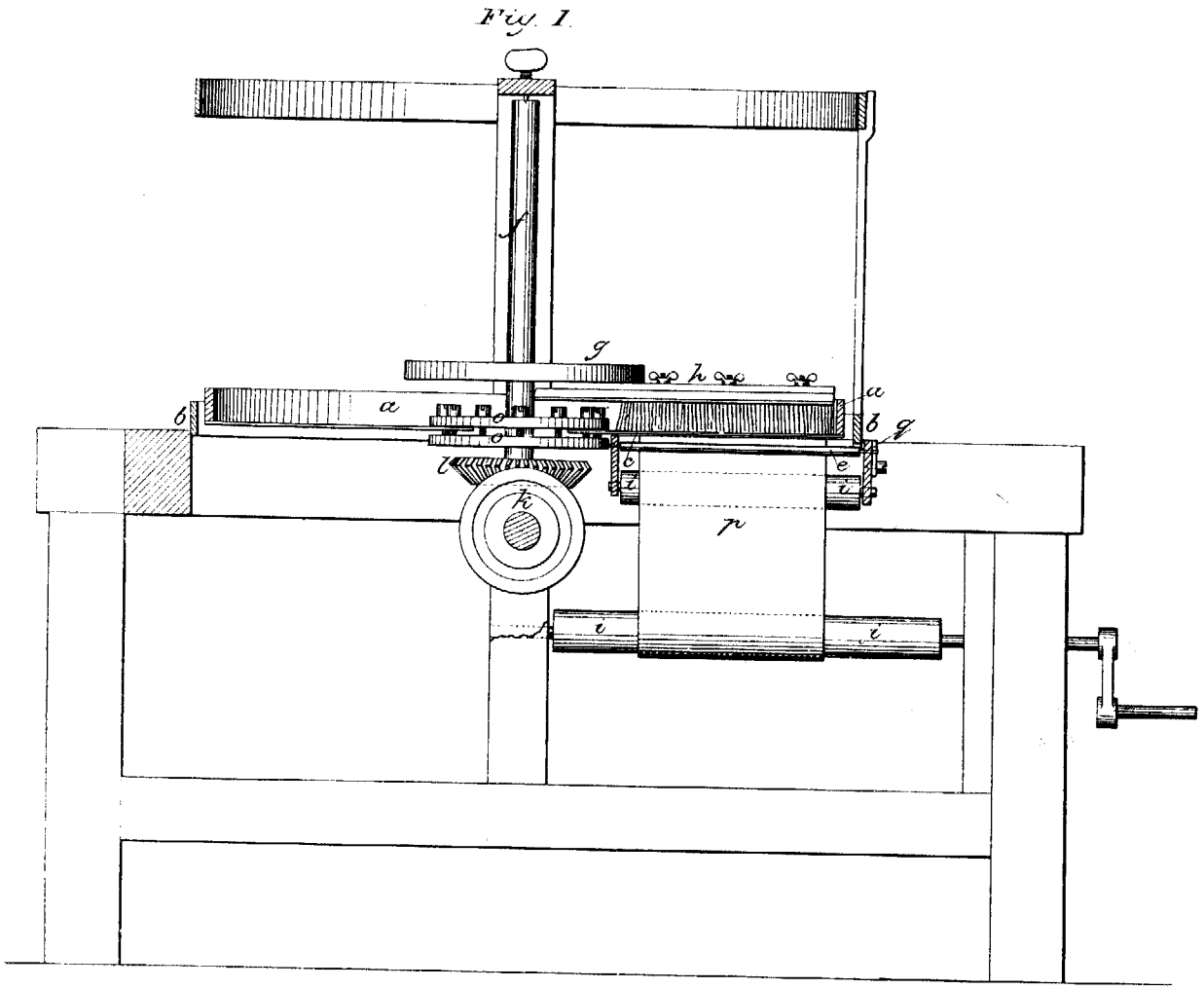
Figure 2:
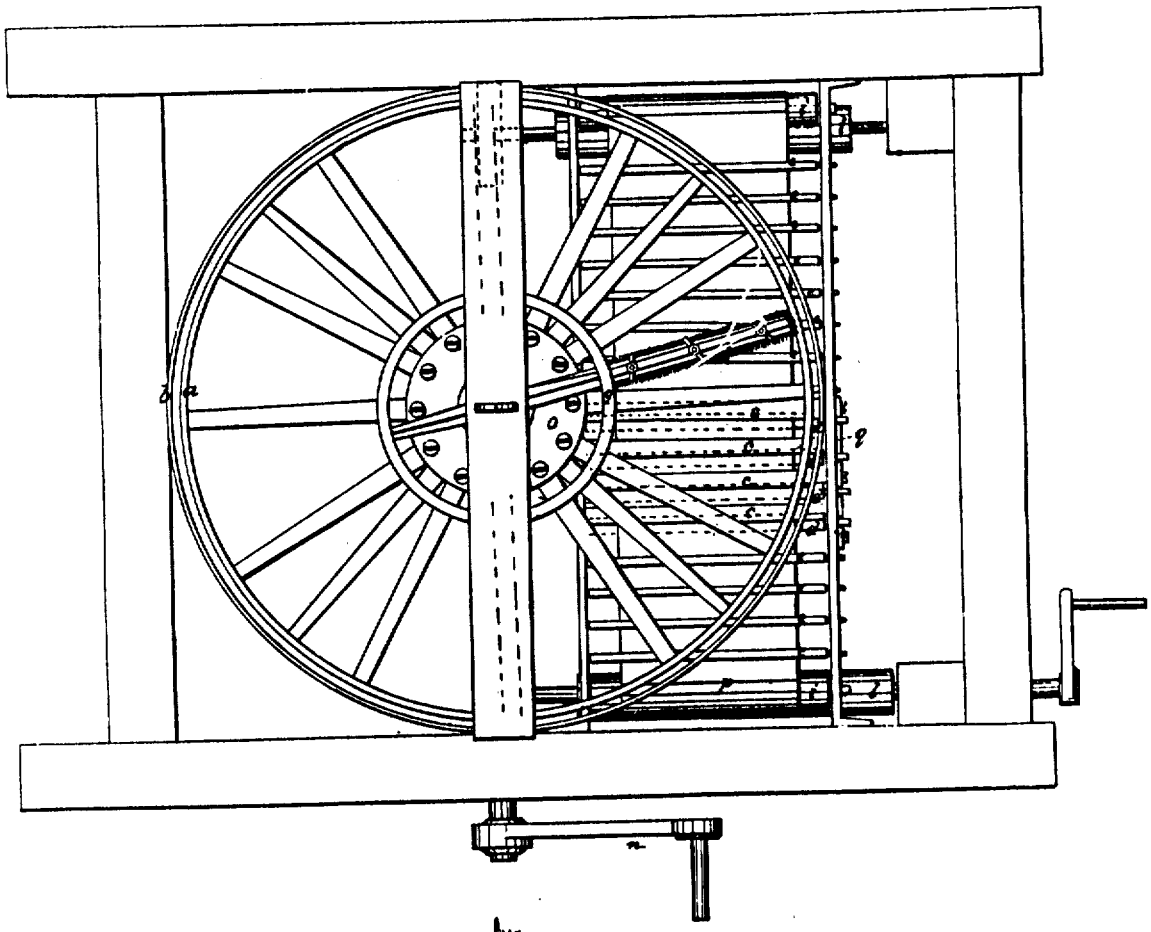
Figure 3:
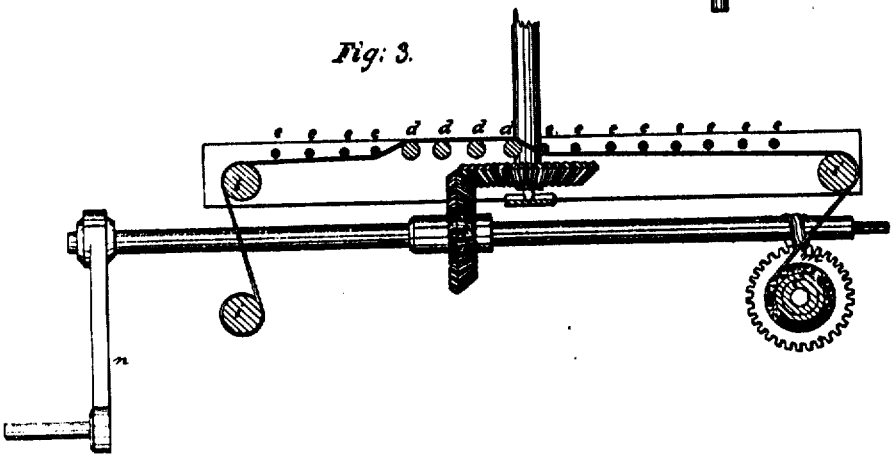

No Printed Specification Available

2 Sheets—Sheet 1.

46X

S. G. DORR.

CLOTH SHEARING MACHINE.

Patented Oct. 20, 1792.

THE NORRIS PETERS CO., PHOTO-LITHO., WASHINGTON, D. C.

46X

Sheet 2. 2 Sheets.

S. G. Dorr.

Cloth Shearing Mach.

Patented Oct. 20, 1792.

UNITED STATES PATENT OFFICE
PTO - BOYERS, PA DUTY STATION

---

MISSING PAGE TEMPORARY NOTICE

PATENT # RX 46 FOR ISSUE DATE 10-20-1792 HAS BEEN SCANNED, BUT WITH MISSING PAGE(S). UPON RECEIPT OF MISSING PAGE(S), THE ENTIRE DOCUMENT WILL BE RESCANNED. IF YOU HAVE ANY QUESTIONS, PLEASE CONTACT DENEISE BOYD OF THE CENTRAL COMPUTER OPERATIONS SUPPORT DIVISION (CCOSD) BY E-MAIL AT HER ADDRESS DENEISEBOYD@USPTO.GOV OR BY PHONE (703) 306-3116.

THIS NOTICE IS FOR THE MISSING PAGE CONTAINING:

All text 2-20-98

DATA CONVERSION OPERATION
BOYERS, PA